United States Patent
Sato et al.

(10) Patent No.: US 7,622,546 B2
(45) Date of Patent: *Nov. 24, 2009

(54) PRODUCTION PROCESS OF ALIPHATIC POLYESTER

(75) Inventors: Hiroyuki Sato, Fukushima (JP);
Tomohiro Hoshi, Fukushima (JP);
Yasushi Okada, Fukushima (JP);
Yoshinori Suzuki, Fukushima (JP)

(73) Assignee: Kureha Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/530,554

(22) PCT Filed: Oct. 8, 2003

(86) PCT No.: PCT/JP03/12881

§ 371 (c)(1),
(2), (4) Date: Apr. 7, 2005

(87) PCT Pub. No.: WO2004/033527

PCT Pub. Date: Apr. 22, 2004

(65) Prior Publication Data

US 2006/0004183 A1 Jan. 5, 2006

(30) Foreign Application Priority Data

Oct. 8, 2002 (JP) ............................. 2002-294563

(51) Int. Cl.
*C08G 63/06* (2006.01)
*C08G 63/08* (2006.01)

(52) U.S. Cl. .................... 528/354; 528/272; 528/355; 528/357; 528/361

(58) Field of Classification Search .............. None
See application file for complete search history.

(56) References Cited

U.S. PATENT DOCUMENTS

| 2,668,162 | A | | 2/1954 | Lowe |
| 3,442,871 | A | | 5/1969 | Schmitt et al. |
| 5,342,918 | A | * | 8/1994 | Howelton et al. ........... 528/318 |
| 5,412,067 | A | * | 5/1995 | Shinoda et al. ............ 528/361 |
| 6,437,565 | B1 | * | 8/2002 | Early et al. ................. 324/309 |

FOREIGN PATENT DOCUMENTS

| JP | 07-233246 | 9/1995 |
| JP | 08-301864 | 11/1996 |
| JP | 09-328481 | 12/1997 |
| JP | 10-025288 | 1/1998 |
| JP | 10-158371 | 6/1998 |
| JP | 2000 119269 | 4/2000 |
| WO | WO 0214303 | 2/2002 |

OTHER PUBLICATIONS

Handbook of Thermoplastic Polymers, 2002, Chapter 2, pp. 59-103.*
K. Chujo et al, "Ring-Opening Polymerization of Glycolide", *Die Makromolekulare Chemie*, 100 (1967) pp. 262-266.

* cited by examiner

*Primary Examiner*—Vasu Jagannathan
*Assistant Examiner*—Gennadiy Mesh
(74) *Attorney, Agent, or Firm*—Porter, Wright, Morris & Arthur LLP

(57) ABSTRACT

A process for producing an aliphatic polyester by subjecting a cyclic ester to ring-opening polymerization, which comprises adding water to a cyclic ester purified to the extent that a water content is at most 60 ppm to control an overall proton concentration in the cyclic ester, thereby controlling at least one physical property among melt viscosity, molecular weight and yellowness index of the resulting aliphatic polyester.

20 Claims, No Drawings

PRODUCTION PROCESS OF ALIPHATIC POLYESTER

TECHNICAL FIELD

The present invention relates to a production process of an aliphatic polyester such as polyglycolic acid by subjecting a cyclic ester such as glycolide to ring-opening polymerization, and particularly to a production process of an aliphatic polyester, by which a purified cyclic ester is used as a starting material, and water is added to the cyclic ester to control the overall proton concentration in the cyclic ester, thereby controlling at least one physical property among melt viscosity, molecular weight and yellowness index of the resulting aliphatic polyester.

BACKGROUND ART

Since aliphatic polyester such as polyglycolic acid and polylactic acid are degraded by microorganisms or enzymes present in the natural world such as soil and sea, they attract attention as biodegradable polymeric materials which impose little burden on the environment. The aliphatic polyesters are also utilized as medical polymeric materials for surgical sutures, artificial skins, etc. because they have degradability and absorbability in vivo.

Among the aliphatic polyesters, polyglycolic acid is excellent in gas barrier properties such as oxygen gas barrier property, carbon dioxide barrier property and water vapor barrier property and also excellent in heat resistance and mechanical strength, and so its new uses have been developed either singly or in the form of a composite with other resin materials in fields of packaging materials and the like.

An aliphatic polyester can be produced by, for example, dehydration polycondensation of an α-hydroxycarboxylic acid such as glycolic acid or lactic acid. In order to efficiently synthesize a high-molecular weight aliphatic polyester, a process comprising synthesizing a cyclic diester of an α-hydroxycarboxylic acid and subjecting the cyclic diester to ring-opening polymerization is generally adopted. For example, when glycolide, which is a cyclic diester of glycolic acid, is subjected to ring-opening polymerization, polyglycolic acid is obtained. When lactide, which is a cyclic diester of lactic acid, is subjected to ring-opening polymerization, polylactic acid is obtained.

A cyclic ester generally contains impurities such as an α-hydroxycarboxylic acid used as a raw material, free carboxylic compounds such as linear α-hydroxycarboxylic acid oligomers, and water. Since the impurities such as water adversely affect the ring-opening polymerization of the cyclic ester, it is proposed to use a cyclic ester, from which impurities have been removed, upon ring-opening polymerization.

On the other hand, an alcohol such as a higher alcohol is used as a polymerization controller of molecular weight upon the ring-opening polymerization of the cyclic ester for controlling the molecular weight of the resulting aliphatic polyester (for example, U.S. Pat. No. 3,442,871).

It is also proposed to remove impurities such as water from a cyclic ester (for example, Japanese Patent Application Laid-Open No. 301864/1996). This document indicates that the impurities such as water, an α-hydroxycarboxylic acid and low-molecular weight oligomers thereof in the cyclic ester exert various actions on an initiator, a chain-transfer agent, a catalyst inactivator and the like to inhibit the ring-opening polymerization, and so these impurities should be removed.

It is proposed to produce an aliphatic polyester by subjecting a cyclic ester having a water content of at most 80 ppm and an acid value of at most 0.10 mg KOH/g to ring-opening polymerization (for example, Japanese Patent Application Laid-Open No. 158371/1998). This document describes the fact that when the amount of water in the cyclic ester is reduced, the polymerization rate is accelerated to obtain a high-molecular weight polymer, and that when an alcohol is caused to exist in a polymerization system, the action of water can be inhibited to produce a high-quality aliphatic polyester.

In a production process of an aliphatic polyester by subjecting a cyclic ester to ring-opening polymerization, it is proposed to determine the amount of a hydroxyl group-containing compound added to a reaction system on the basis of the amount of free carboxylic compounds contained in the cyclic ester (for example, Japanese Patent No. 3075665). In this document, an α-hydroxycarboxylic acid used upon the production of the cyclic ester and linear α-hydroxycarboxylic acid oligomers are shown as the free carboxylic compounds, and the document describes that a linear saturated aliphatic monoalcohol having 12 to 18 carbon atoms is preferred as the hydroxyl group-containing compound.

This document also indicates that when the impurities such as water and free carboxylic compounds are contained in the cyclic ester, the polymerization reaction is adversely affected, and so targeting that a polymer having a targeted molecular weight is produced becomes impossible even under the same polymerization conditions. This document describes the fact that since a high water content shows a tendency to make the control of a molecular weight of the resulting aliphatic polyester difficult, the water content in the cyclic ester is preferably controlled to at most 100 ppm for the purpose of controlling the molecular weight with good accuracy.

The document further indicates that although water in the cyclic ester can be easily removed in a purification and drying process just before the polymerization, the free carboxylic compounds are difficult to be removed, exert a great influence on the polymerization reaction, and moreover the cyclic ester is ring-opened by a minute amount of water during its storage to easily form new free carboxylic compounds. In this document, it is proposed to determine free carboxylic compounds contained in the cyclic ester and add a hydroxyl group-containing compound (for example, higher alcohol) in an amount corresponding to this amount, thereby producing an aliphatic polyester having a targeted molecular weight.

As described above, the fact that a cyclic ester, from which impurities such as water and free carboxylic compounds have been removed, is used in a process for producing an aliphatic polyester by ring-opening polymerization of the cyclic ester, and an alcohol, particularly a higher alcohol is used as a molecular weight modifier was the state of the art. A technique of producing a cyclic ester such as glycolide with high purity has been developed in recent years, and so it has been comparatively easy to produce or obtain a cyclic ester containing impurities such as water in little amount. On the other hand, it is expected that a problem attended on the use of a higher alcohol as a molecular weight modifier is potentialized under the circumstances that aliphatic polyesters such as polyglycolic acid are produced on an industrial scale.

The reason why alcohols are used as a molecular weight modifier is that the hydroxyl group thereof contributes to the control of the molecular weight. The reason why a higher alcohol among the alcohols is generally used is that the concentration of the hydroxyl group in the higher alcohol is low, and so a weighing error becomes little to gain an advantage from the viewpoint of a charging operation upon polymerization. For example, when an aliphatic polyester such as polyglycolic acid is produced on a small scale, the amount of an alcohol used as a molecular weight modifier becomes greater as the molecular weight of the alcohol increases though the amount thereof is extremely small, so that weighing accuracy and handling characteristics are improved. In addition, since the higher alcohol has a boiling point higher than a temperature of ring-opening polymerization, and so a stable polymerization operation can be expected.

However, a higher alcohol such as lauryl alcohol (also referred to as "dodecanol" or "dodecyl alcohol") is expensive and has involved a problem that since it is viscous, it tends to remain in a charging device (for example, syringe) when charged into a polymerization reaction system, and so its loss becomes great. In addition, when the higher alcohol is used in the production of an aliphatic polyester in an industrial scale, it involves such many problems related to increase in the production cost of the aliphatic polyester that (1) its amount used becomes great, (2) a tank and a weighing device, which are temporarily used for charging the alcohol into a polymerization reactor, are enlarged in size, (3) an apparatus used is required to take safety measures because the alcohol is combustible, (4) cleaning of the apparatus is required after the apparatus are used, and (5) a cleaning liquid used in the cleaning of the apparatus must be treated.

In addition, when a higher alcohol is added to a cyclic ester, an aliphatic polyester having a polymer structure that the higher alcohol is introduced therein is formed because the higher alcohol also acts as an initiator, and so the physical properties of the resulting aliphatic polyester are changed. Further, the higher alcohol is insufficient in solubility in the cyclic ester, and consequently a ring-opening polymerization reaction has taken place unevenly to cause a problem in the precise control of the molecular weight and melt viscosity of the resulting polymer.

DISCLOSURE OF THE INVENTION

It is an object of the present invention to provide a novel process for producing an aliphatic polyester such as polyglycolic acid by subjecting a cyclic ester such as glycolide to ring-opening polymerization, by which physical properties such as a melt viscosity and a molecular weight can be precisely controlled by using water as a molecular weight control agent.

The present inventors have carried out an extensive investigation with a view toward achieving the above object. As a result, it has been found that a cyclic ester highly purified to the extent that a water content is at most 60 ppm (by weight) is used as a monomer in a process for producing an aliphatic polyester by subjecting a cyclic ester to ring-opening polymerization, water is added to the cyclic ester to control the overall proton concentration in the cyclic ester, whereby at least one physical property among melt viscosity, molecular weight and yellowness index of the resulting aliphatic polyester can be controlled.

It has been a matter of common sense in technology that water is removed as impurities inhibiting the ring-opening polymerization of the cyclic ester. However, it has been surprisingly proved that water has an excellent action as a molecular weight control agent. When a small amount of water is added to, for example, glycolide to control the overall proton concentration in the glycolide within a range of a low level, polyglycolic acid having a high molecular weight and a high melt viscosity compared with the case where no molecular weight control agent is used, or a higher alcohol is used as a molecular weight control agent can be obtained.

When the overall proton concentration is changed by addition of water, the melt viscosity and molecular weight of the resulting aliphatic polyester such as polyglycolic acid are changed. In this case, there is a correlation between the overall proton concentration and the melt viscosity or molecular weight. Therefore, the overall proton concentration is controlled by addition of water, whereby an aliphatic polyester having a targeted melt viscosity or molecular weight can be produced. In addition, when water is used as a molecular weight control agent, a volatile component (volatile matter) such as a remaining monomer in a polymer formed can be markedly reduced compared with the case where a higher alcohol is used. Further, when water is used as a molecular weight control agent, the yellowness index (YI) of the resulting aliphatic polyester becomes low within a range that the melt viscosity and molecular weight of the aliphatic polyester are low, and the polymer can be provided as a polymer inhibited in coloring. The present invention has been led to completion on the basis of these findings.

According to the present invention, there is thus provided a process for producing an aliphatic polyester by subjecting a cyclic ester to ring-opening polymerization, which comprises adding water to a cyclic ester purified to the extent that a water content is at most 60 ppm to control an overall proton concentration in the cyclic ester, thereby controlling at least one physical property among melt viscosity, molecular weight and yellowness index of the resulting aliphatic polyester.

BEST MODE FOR CARRYING OUT THE INVENTION

1. Cyclic Ester

The cyclic ester used in the present invention is preferably a cyclic diester of an α-hydroxycarboxylic acid, a lactone, or any other cyclic compound having an ester structure. As examples of the α-hydroxycarboxylic acid forming the cyclic diester, may be mentioned glycolic acid, L- and/or D-lactic acid, α-hydroxybutanoic acid, α-hydroxyisobutanoic acid, α-hydroxyvaleric acid, α-hydroxycaproic acid, α-hydroxyisocaproic acid, α-hydroxyheptanoic acid, α-hydroxy-octanoic acid, α-hydroxydecanoic acid, α-hydroxymyristic acid, α-hydroxystearic acid, and alkyl-substituted products thereof.

Examples of the lactone include β-propiolactone, β-butyrolactone, pivalolactone, γ-butyrolactone, δ-valero-lactone, β-methyl-δ-valerolactone and ε-caprolactone.

As examples of the other cyclic compound having an ester structure, may be mentioned dioxane.

A cyclic ester having an asymmetric carbon atom may be any of a D body, an L body and a racemic body. These cyclic esters may be used either singly or in any combination thereof. When at least 2 cyclic esters are used in combination, an optional aliphatic copolyester can be obtained. The cyclic ester may be copolymerized with another comonomer. Examples of another comonomer include cyclic monomers such as trimethylene carbonate and 1,3-dioxanone.

Among the cyclic esters, glycolide, which is a cyclic diester of glycolic acid, L- and/or D-lactide, which is a cyclic diester of L- and/or D-lactic acid, and mixtures thereof are preferred, with glycolide being more preferred. Glycolide may be used by itself. However, it may be used in combination with another cyclic monomer to produce a polyglycolic acid copolymer (copolyester). When the polyglycolic acid copolymer is produced, it is desirable that a proportion of glycolide copolymerized is preferably 60% by weight, more preferably at least 70% by weight, particularly preferably at least 80% by weight from the viewpoint of physical properties of the copolyester formed, such as crystallinity and gas barrier properties. Preferable examples of the cyclic monomer copolymerized with glycolide include lactide, ε-caprolactone, dioxanone and trimethylene carbonate.

No particular limitation is imposed on the production process of the cyclic ester. For example, glycolide can be obtained by a process comprising depolymerizing a glycolic acid oligomer. As the depolymerization process of the glycolic acid oligomer, may be adopted, for example, a melt depolymerization process described in U.S. Pat. No. 2,668,162, a solid-phase depolymerization process described in Japanese Patent Application Laid-Open No. 2000-119269, or a solution-phase depolymerization process described in Japanese Patent Application Laid-Open No. 328481/1997 and International Publication No. 02/14303A1 Pamphlet. Glycolide obtained as a cyclic condensate of a chloroacetic acid salt, which is reported in K. Chujo, et al., Die Makromolekulare Cheme, 100 (1967), 262-266, may also be used.

Among the depolymerization processes described above, the solution-phase depolymerization process is preferred for obtaining glycolide. According to the solution-phase depolymerization process, (1) a mixture containing a glycolic acid oligomer and at least one high-boiling polar organic solvent having a boiling point within a range of 230-450° C. is heated to a temperature, at which the depolymerization of the oligomer takes place, under ordinary pressure or under reduced pressure; (2) the oligomer is dissolved in the solvent until a residual rate (volume ratio) of a melt phase of the oligomer reaches 0.5 or lower; (3) the heating is further continued at the same temperature to depolymerize the oligomer; (4) a cyclic diester (i.e., glycolide) formed is distilling out together with the high-boiling polar organic solvent; and (5) glycolide is recovered from the distillate.

As examples of the high-boiling polar organic solvent, may be mentioned aromatic carboxylic acid esters, such as bis(alkoxyalkyl) phthalates such as di(2-methoxyethyl) phthalate, alkylene glycol dibenzoates such as diethylene glycol dibenzoate, benzylbutyl phthalate, and dibutyl phthalate; aromatic phosphoric acid esters such as tricresyl phosphate; and polyalkylene glycol ethers such as polyethylene dialkyl ethers. The high-boiling polar organic solvent is generally used in a proportion of 0.3 to 50 times (weight ratio) to the oligomer. Polypropylene glycol, polyethylene glycol, tetraethylene glycol or the like may be used as a solubilizing agent for the oligomer in combination with the high-boiling polar organic solvent as needed. The depolymerization temperature of the glycolic acid oligomer is generally 230° C. or higher, preferably 230 to 320° C. Although the depolymerization is performed under atmospheric pressure or reduced pressure, it is preferable to heat the oligomer under reduced pressure of 0.1 to 90.0 kPa (1 to 900 mbar) to depolymerize it.

A cyclic ester purified to the extent that a water content is at most 60 ppm (by weight), preferably at most 50 ppm, more preferably at most 40 ppm is used as the cyclic ester. If the water content in the cyclic ester of the starting material is too high, the controllable range of melt viscosity and molecular weight of the resulting polymer are limited even when water is added as the molecular weight control agent.

The content of hydroxycarboxylic compounds contained as impurities in the cyclic ester is preferably as low as possible. The content of an α-hydroxycarboxylic acid in the cyclic ester is preferably at most 200 ppm (by weight), more preferably at most 150 ppm, still more preferably at most 130 ppm, particularly preferably at most 100 ppm.

Linear α-hydroxycarboxylic acid oligomers are generally contained in the cyclic ester. Most of these oligomers are linear α-hydroxycarboxylic acid dimmer. The content of the linear α-hydroxycarboxylic acid oligomers in the cyclic ester is preferably at most 2,000 ppm (by weight), more preferably at most 1,500 ppm, still more preferably at most 1,200 ppm, particularly preferably at most 1,000 ppm.

Cyclic esters such as glycolide and lactide undergo hydrolysis reaction and polymerization reaction with a minute amount of water contained as impurities during their storage and thus show a tendency to increase the contents of α-hydroxycarboxylic acids and α-hydroxycarboxylic acid oligomers. Therefore, it is desirable that the water content in the cyclic ester just after purification is at most 50 ppm, the α-hydroxycarboxylic acid content is at most 100 ppm, and the linear α-hydroxycarboxylic acid oligomer content is at most 1,000 ppm. Incidentally, the purification of the ccyclic ester may be performed by combining a recrystallization treatment, a drying treatment and the like with each other in accordance with a method known per se in the art.

2. Production Process of Aliphatic Polyester

In order to produce an aliphatic polyester using the cyclic ester, it is preferable to adopt a process comprising heating the cyclic ester to conduct ring-opening polymerization. This ring-opening polymerization process is substantially a bulk ring-opening polymerization process. The ring-opening polymerization is conducted at a temperature within a range of generally 100 to 270° C., preferably 120 to 260° C. in the presence of a catalyst.

No particular limitation is imposed on the catalyst so far as it may be used as a ring-opening polymerization catalyst for various kinds of cyclic esters. Specific examples of such catalysts include metallic compounds such as oxides, chlorides, carboxylates and alkoxides of tin (Sn), titanium (Ti), aluminum (Al), antimony (Sb), zirconium (Zr) and zinc (Zn). More specifically, preferable examples thereof include tin compounds such as tin halides (for example, tin dichloride, tin tetrachloride, etc.) and organic tin carboxylates (for example, tin octanoates such as tin 2-ethylhexanoate); titanium compounds such as alkoxytitanium; aluminum compounds such as alkoxyaluminum; zirconium compounds such as zirconium acetylacetone; and antimony halides. However, the catalysts are not limited thereto.

The amount of the catalyst used may be a little to the cyclic ester and is selected from a range of generally 0.0001 to 0.5% by weight, preferably 0.001 to 0.1% by weight based on the cyclic ester.

In the present invention, the contents of water and hydroxycarboxylic compounds contained as impurities in the cyclic ester are measured prior to the ring-opening polymerization to calculate out an overall proton quantity in the impurities on the basis of the respective contents. The water content in the cyclic ester may be measured by means of a Karl Fischer's aquameter. The α-hydroxy-carboxylic acids and linear α-hydroxycarboxylic acid oligomers contained in the cyclic ester are determined by gas chromatographic analysis or the like after the respective carboxylic groups are converted into alkyl ester groups.

The overall proton concentration of the impurities contained in the cyclic ester is calculated out on the basis of the total quantity of the hydroxycarboxylic compounds and water contained as impurities in the cyclic ester. In the case of, for example, glycolide, a minute amount of water and hydroxycarboxylic compounds composed of glycolic acid and linear glycolic acid oligomers are contained as the impurities. Most of the linear glycolic acid oligomers contained in purified glycolide are a dimer of glycolic acid. In the case of lactide, water, lactic acid and linear lactic acid oligomers are contained as the impurities. The proton concentration (mol %) based on these hydroxycarboxylic compounds is calculated out on the basis of the contents and molecular weights of the respective compounds and the number (generally 1 group) of hydroxyl groups. The proton concentration (mol %) of water is calculated out on the basis of the content and molecular weight of water. The proton concentration is calculated out as mol % based on the total amount of the cyclic ester and impurities.

The overall proton concentration of the impurities contained in the cyclic ester is preferably 0.01 to 0.5 mol. %, more preferably 0.02 to 0.4 mol %, particularly preferably 0.03 to 0.35 mol %. Since there is a limit to lowering of the contents of the hydroxycarboxylic compounds by purification, it is difficult to low the overall proton concentration of the impurities to the utmost. If the overall proton concentration of the impurities is too high, it is difficult to precisely control the melt viscosity and molecular weight of the resulting polymer by addition of water.

In the present invention, water is added to a cyclic ester purified to the extent that a water content is at most 60 ppm to control the overall proton concentration in the cyclic ester, thereby controlling at least one physical property among melt viscosity, molecular weight and yellowness index of an aliphatic polyester formed. The overall proton concentration in the cyclic ester is controlled within a range of preferably higher than 0.09 mol %, but lower than 2.0 mol %, more preferably 0.1 to 1.0 mol % by adding water to the purified cyclic ester.

The melt viscosity is a physical property required to preset molding or forming conditions of the aliphatic polyester and also used for expecting the mechanical strength and the like of the resulting molded or formed product. Accordingly, from the viewpoint of production technique, it is an important object to produce an aliphatic polyester having a targeted melt viscosity. The molecular weight of the aliphatic polyester is also a physical property related to the presetting of molding or forming conditions thereof and the mechanical strength of the resulting molded or formed product. The yellowness index of the aliphatic polyester is an index indicating the quality of the aliphatic polyester and is an important physical property even from the viewpoint of adjusting to a desired color.

When ring-opening polymerization is conducted without adding water to the purified cyclic ester, an unreacted monomer tends to remain in a polymer formed. If the content of volatile matter comprising the remaining monomer as a main component becomes high, the melt viscosity of the resulting polymer is lowered in addition to deterioration of its quality, and the yellowness index is also made high. It is difficult to control the melt viscosity or the like of the resulting polymer by mere control of the degree of purification of the cyclic ester.

When a higher alcohol is used as a molecular weight control agent, the amount of the volatile matter can be somewhat reduced. However, the reduction is not yet sufficient, and a polymer containing the remaining monomer in a considerable amount is formed. Therefore, it is difficult to precisely control of the melt viscosity of the polymer formed by using the higher alcohol. More specifically, it is possible to control the molecular weight (for example, weight average molecular weight) of the resulting aliphatic polyester using the higher alcohol. Since the polymer contains the remaining monomer in a great amount, however, the melt viscosity thereof may be low in some cases. In this case, the melt viscosity of the polymer is affected by not only the molecular weight thereof, but also the amount of the remaining monomer. When the higher alcohol is as the molecular weight control agent, it is difficult to lessen the yellowness index.

On the other hand, when the overall proton concentration in a purified cyclic ester is controlled by adding water to the cyclic ester, the physical properties of a polymer formed, such as melt viscosity, molecular weight and yellowness index can be precisely controlled. It has been surprisingly proved that water is used as a molecular weight control agent, the reaction efficiency of the ring-opening polymerization becomes high, and the content of volatile matter comprising a remaining monomer as a main component can be reduced. In other words, when water is used as the molecular weight control agent, a polymer having a high molecular weight and a high melt viscosity can be synthesized. When the overall proton concentration in the cyclic ester is changed by addition of water, the melt viscosity and molecular weight of the polymer formed can be controlled within the desired respective ranges while reducing the amount of the volatile matter (residual monomer) to a low level. As a result, a close correlation grows up between the overall proton concentration in the cyclic ester and the melt viscosity or molecular weight of the polymer.

More specifically, such a correlation as described above can be clarified by conducting ring-opening polymerization under the same polymerization conditions (reaction vessel, polymerization temperature, polymerization time, the kind and purification degree of the monomer used, etc.) except that the overall proton concentration in the cyclic ester is changed by changing the amount of water added, measuring the melt viscosities, molecular weights and yellowness indexes of the resulting aliphatic polyesters and carrying out regression analysis using the measured results as a database.

For example, the overall proton concentration was changed by adding water to glycolide, and the melt viscosity, weight average molecular weight and yellowness index of polyglycolic acid obtained by ring-opening polymerization of the glycolide were measured. As a result, it was proved that these respective physical properties have relation to the overall proton concentration.

In order to carry out the regression analysis on the basis of the database, for example, the overall proton concentration (x) is used as an independent variable (explanatory variable), and the melt viscosity (y) of the polyglycolic acid is used as a dependent variable (explained variable). As the result of the regression analysis, it was found that relational expressions of a linear model, a double logarithm model and a semilogarithm model are established between them. It was proved that among these, the relational expression of the semilogarithm model represented by the following expression (1):

$$y = a \cdot b^x \quad (1)$$

wherein a and b are parameters, is the highest in multiple correlation R and multiple determination $R^2$.

A targeted melt viscosity value (y) is substituted into this relational expression (1), whereby its corresponding overall proton concentration (x) can be calculated out. Now, when a difference between this overall proton concentration (x) and a proton concentration (overall proton concentration before the addition of water) of impurities in the cyclic ester is calculated out, and water in an amount corresponding to this difference is added, an aliphatic polyester having a targeted melt viscosity can be obtained.

Accordingly, when water is added to a purified cyclic ester (for example, glycolide) to control the overall proton concentration in the cyclic ester, the amount of water added to the cyclic ester is controlled on the basis of the relational expression between a predetermined overall proton concentration in the cyclic ester and a physical property value to be controlled so as to give an overall proton concentration corresponding to a targeted value of the physical property to be controlled, whereby an aliphatic polyester (for example, polyglycolic acid) having the targeted melt viscosity can be obtained.

According to the process of the present invention, the overall proton concentration in the cyclic ester is controlled under the same polymerization conditions by addition of water, whereby not only a melt viscosity but also a molecular weight such as a weight average molecular weight can be controlled. The reason for it is that the amount of volatile matter, which affects the melt viscosity, to be formed can be markedly reduced by using water as a molecular weight control agent.

The reason why the relational expression of the semilogarithm model, such as the expression (1), is established is that when the amount of water added is lessened to control the overall proton concentration in the cyclic ester low, an aliphatic polyester having a higher molecular weight and a higher melt viscosity compared with the case where a higher alcohol is used as a molecular weight control agent, or no molecular weight control agent is used is obtained.

When the amount of water added is increased to raise the overall proton concentration in the cyclic ester, the melt viscosity and molecular weight of a polymer formed become low. However, it has been found that its yellowness index (YI) becomes low in reverse proportion to the amount to improve the degree of coloring. Accordingly, the overall proton concentration in the cyclic ester can be controlled by addition of water, thereby producing an aliphatic polyester having a low melt viscosity suitable for injection molding or the like and a low yellowness index.

According to the process of the present invention, the melt viscosity, molecular weight and yellowness index of the resulting aliphatic polyester can be controlled. Accordingly, regression analysis such as simple regression analysis or multiple regression analysis is performed on the basis of a database between the overall proton concentration in the cyclic ester and these physical properties, whereby a relational expression of a linear model or non-linear model (double logarithm model or semilogarithm model) can be easily prepared, and an amount of water added can be thereby controlled so as to give an overall proton concentration corresponding to a targeted physical property value. As a model of such a relational expression, a model highest in multiple correlation R and multiple determination $R^2$ is desirably selected.

The ring-opening polymerization of the cyclic ester may be optionally conducted by means of a polymerization vessel or in an extruder according to the kind of the monomer used. However, it is generally preferable to adopt a method of conducting bulk ring-opening polymerization in the polymerization vessel. For example, when glycolide is heated, it is melted in a liquid state, whereas a polymer is formed when the heating is continued to subject the melt to ring-opening polymerization. In a polymerization reaction system whose polymerization temperature is lower than a crystallization temperature of a polymer formed, a polymer is deposited in the course of the polymerization reaction, and a solid polymer is finally obtained. The polymerization time varies according to the method of the ring-opening polymerization, polymerization temperature, etc. However, it is generally 10 minutes to 100 hours, preferably 30 minutes to 50 hours, more preferably 1 to 30 hours. The conversion of polymerization is generally at least 95%, preferably at least 98%, more preferably at least 99%. It is however the most preferable that the monomer be fully converted from the viewpoints of lessening the remaining of an unreacted monomer and enhancing production efficiency.

Accordingly, in the present invention, is preferred a process comprising adding water to a purified cyclic ester to control the overall proton concentration in the cyclic ester, heating and melting the cyclic ester in the presence of a catalyst and then subjecting the cyclic ester to ring-opening polymerization in the molten state. This polymerization process is a bulk ring-opening polymerization process.

In the present invention, is more preferred a process comprising adding water to a purified cyclic ester to control the overall proton concentration in the cyclic ester, heating and melting the cyclic ester in the presence of a catalyst in a melting vessel, transferring the cyclic ester in the molten state to a polymerization equipment with a plurality of tubes capable of being closed and opened at their both ends and then subjecting the cyclic ester to ring-opening polymerization in the closed state in the respective tubes to separate out a polymer formed. In the present invention, it is also preferred to adopt a process comprising adding water to a purified cyclic ester to control the overall proton concentration in the cyclic ester, heating and melting the cyclic ester in the presence of a catalyst in a melting vessel, allowing the ring-opening polymerization of the cyclic ester in the molten state to progress in a reaction vessel equipped with a stirrer, taking out a polymer formed, cooling and solidifying the polymer once and then continuing solid phase polymerization at a temperature lower than the melting point of the polymer. The polymerization temperature is controlled in the closed system, whereby a polymer having physical properties such as a targeted melt viscosity can be stably produced with good reproducibility.

According to the process of the present invention, polyglycolic acid having a melt viscosity of preferably 50 to 6,000 Pa·s, more preferably 100 to 5,000 Pa·s as measured at a temperature of 240° C. and a shear rate of 121 $sec^{-1}$ can be provided by ring-opening polymerization of a cyclic ester (for example, glycolide or a cyclic ester comprising glycolide as a main component). According to the process of the present invention, a high-molecular weight aliphatic polyester having a weight average molecular weight of preferably at least 50,000, more preferably 80,000, particularly preferably at least 100,000 can be produced. The upper limit of the weight average molecular weight is about 500,000.

According to the process of the present invention, an aliphatic polyester having a yellowness index (YI) of about 4 to 20 can be provided, and the yellowness index can be controlled by controlling its molecular weight. For example, the weight average molecular weight is controlled to at most 200,000, further at most 180,000, whereby a polymer having a yellowness index (YI) of at most 10 can be provided.

In the present invention, water is used as a molecular weight control agent in the process for producing an aliphatic polyester by subjecting a cyclic ester to ring-opening polymerization. According to the state of the prior art, it is only taught to reduce the water content in the cyclic ester as much as possible because water adversely affects the ring-opening polymerization of the cyclic ester as impurities, particularly exerts adverse influence on polymerization rate, molecular weight and melt viscosity.

The fact that water in the cyclic ester affects the molecular weight and melt viscosity of the resulting aliphatic polyester does not suggest that water can be used as a molecular weight control agent. Since water is lower in molecular weight than a higher alcohol, its weighing accuracy is low. In addition, since the boiling point of water is lower than the ring-opening polymerization temperature, it is difficult to precisely control a water concentration in the reaction system. Further, it is not that there is an exact correlation between the water content in the cyclic ester and the melt viscosity and molecular weight of the aliphatic polyester. Accordingly, the fact that water acts as a molecular weight control agent and is excellent in practical performance cannot possibly be suggested from the prior art.

It has however be found that when an aliphatic polyester such as polyglycolic acid is produced by ring-opening polymerization of a cyclic ester such as glycolide, a high-purity cyclic ester is used, water is added to the cyclic ester to control the overall proton concentration in the cyclic ester, whereby the melt viscosity and molecular weight of a polymer formed can be precisely controlled. The overall proton concentration in the cyclic ester also depends on the amount of water and hydroxycarboxylic compounds contained as impurities. It has not been known that the melt viscosity and molecular weight of the aliphatic polyester can be controlled by controlling the overall proton concentration in the cyclic ester, including the addition of water.

When an aliphatic polyester is mass-produced on an industrial scale, a comparatively great amount of water is used as a molecular weight control agent, so that the problem of weighing accuracy can be overcome. It is also possible to strictly retain a water concentration in the polymerization reaction system, and in turn, the overall proton concentration by devising a polymerization equipment to adopt a closed system device or the like.

Water is not only cheap but also useful in simplification and scale-down of the apparatus. When water is used as a molecular weight control agent, it is unnecessary to conduct a cleaning operation of the apparatus, a treatment of a cleaning liquid, and the like. According to the process making use of water, a production process suitable even for energy saving, cleaning and environmental protection can be provided. As the water, is preferably used purified water substantially containing none of impurities, such as distilled water or ion-exchanged water.

The production process according to the present invention can be automated or semi-automated by linking a raw material-feeding means, polymerization reactor and the like to an analyzing means and an information processor. For example, a process comprising automatically sampling a cyclic ester to be fed to a melting vessel to analyze an amount of impurities contained therein, inputting the analyzed result thereof into an information processor and comparing it with an overall proton concentration calculated out on the basis of such a relational expression as described above by a computing means and corresponding to a targeted melt viscosity, and calculating out an amount of water according to a difference between them to form a control action signal, thereby feeding necessary amounts of water and the cyclic ester to the melting vessel can be adopted.

According to the production process of the present invention, values of physical properties, such as a melt viscosity, of an aliphatic polyester formed can be expected from the overall proton concentration in the cyclic ester, so that a blending ratio between polymers obtained in respective batches can also be determined for the purpose of obtaining a polymer having a desired physical property value such as a melt viscosity value.

EXAMPLES

The present invention will hereinafter be described more specifically by the following Synthesis Examples, Examples and Comparative Examples. Analyzing methods, measuring methods, calculating methods, etc. are as follows:

(1) Impurity Determining Analysis:

A precisely weighed amount (about 1 g) of glycolide and 25 mg of 4-chlorobenzophenone as an internal standard substance were added into 10 ml of high-purity acetone and sufficiently dissolved. About 1 ml of the resultant solution was taken out, and an ethyl ether solution of diazomethane was added to the solution. The diazomethane solution was added aiming at an amount leaving a yellow color of diazomethane. The yellow-colored solution (2 µl) was charged into a gas chromatograph to determine methyl-esterified glycolic acid and a glycolic acid dimer on the basis of an area ratio of the internal standard substance and the amounts of the glycolide and internal standard substance added.

<Conditions of Gas Chromatographic Analysis>
  Apparatus: Hitachi G-3000,
  Column: TC-17 (0.25 mm in diameter×30 m in length),
  Temperature of vaporizing chamber: 290° C.,
  Column temperature: After retained at 50° C. for 5 minutes, raising the temperature to 270° C. at a heating rate of 20° C./min and holding at 270° C. for 4 minutes, and
  Detector: FID (flame ionization detector), temperature: 300° C.

With respect to lactide, impurities were determined in the same manner as in glycolide.

(2) Measurement of Water:

A Karl Fischer's aquameter [CA-100, manufactured by Mitsubishi Chemical Corporation (vaporizer: VA-100)] equipped with a vaporizer was used, and a precisely weighed amount (about 2 g) of a polymer sample was placed in the vaporizer preset to 220° C. and heated. A dry nitrogen gas was passed at a flow rate of 250 ml/min through the Karl Fischer's aquameter from the vaporizer. After the sample was introduced into the vaporizer, water vaporized was introduced into a Karl Fischer's solution. An end point was determined to be a point of time an electric conductivity was lowered to +0.1 µg/S from a background. With respect to the water measurement of a monomer, the temperature of the vaporizer was preset to 140° C., and an end point was determined to be a point of time an electric conductivity was lowered to +0.05 µg/S from a background.

(3) Calculating Method of Proton Concentration:

An overall proton concentration in a cyclic ester is calculated out on the basis of the total amount of hydroxycarboxylic compounds and water contained in the cyclic ester. A proton concentration (mol %) based on the hydroxycarboxylic compounds is calculated out on the basis of the contents and molecular weights of the respective compounds and the number of hydroxyl groups. On the other hand, a proton concentration (mol %) based on water is calculated out on the basis of the total amount of water of impurities contained in the cyclic ester, water contained in an atmosphere such as a treating vessel and water added and a molecular weight of water.

(4) Measurement of Water in Monomer-Melting Vessel:

Dry air was allowed to flow in the interior of a monomer-melting vessel in advance to find a relative humidity of its atmosphere by means of a hydrometer. An absolute temperature was calculated out from a temperature of the atmosphere to calculate out an amount of water from this absolute temperature and the volume of the vessel.

(5) Measurement of Volatile Matter:

A ground product of a polymer formed was precisely weighed (about 10 g) in an aluminum-made cup, the cup was placed in a constant-temperature drying oven heated to 120° C., through which dry air had been passed at a flow rate of about 10 liters/min, and left to stand for 6 hours. After the prescribed period of time, the cup was taken out and left to stand for at least 30 minutes in a desiccator, in which silica gel had been charged. Thereafter, the ground product was cooled to room temperature and then weighed to calculate out a percent loss in weight to the initial value.

(6) Melt Viscosity:

A polymer sample was placed in a drying oven heated to 120° C. and brought into contact with dry air to reduce its water content to 100 ppm or lower. Thereafter, the sample was sufficiently dried in the drying oven. The melt viscosity was measured by means of a Capirograph 1-C (manufactured by Toyo Seiki Seisakusho, Ltd.) equipped with a capillary (1 mm in diameter×10 mm in length). After about 20 g of the sample was placed in the apparatus heated to a presetting temperature of 240° C. and held for 5 minutes, the melt viscosity was measured at a shear rate of 121 $sec^{-1}$.

(7) Color Tone:

A color tone was measured by means of a TC-1800 (manufactured by Tokyo Denshoku Gijutsu Center) in accordance with a reflected light measuring method under conditions of standard light C, a visual field of 2° and a calorimetric system. The apparatus was calibrated by a standard white plate (No. 88417). The measurement was conducted 3 times by closest-charging a ground product sample into a special Petri dish (diameter: 3 cm, height: 1.3 cm) so as to contain no fine powder, mounting the Petri dish on a measuring stage and changing the position of the sample, and an average value thereof was calculated out. The color tone was indicated by an YI (yellowness index) value indicating a yellowness index.

(8) Measurement of Molecular Weight:

An amorphous polymer is provided for the purpose of dissolving a polymer sample in a solvent used in the measurement of a molecular weight. More specifically, about 5 g of a sample fully dried was held between aluminum plates, placed on a hot press heated to 275° C., heated for 90 seconds and then pressed for 60 seconds under a pressure of 2 MPa. Thereafter, the polymer was immediately dipped in ice water to quench it. A transparent amorphous pressed sheet was produced in such a manner.

A sample (10 mg) was cut out of the pressed sheet produced by the above-described process. This sample was dissolved in a solution with 5 mM of sodium trifluoroacetate dissolved in hexafluoroisopropanol (HFIP) to prepare a 10 ml of a solution. After the sample solution was filtered through a membrane filter, it was charged into a gel permeation chromatograph (GPC) to measure its molecular weight. Incidentally, the sample was charged into GPC within 30 minutes after the dissolution.

<Conditions of GPC Measurement>
  Apparatus: Shimazu LC-9A,
  Column: HFIP-806M, 2 columns and pre-column are connected in series,
  Column temperature: 40° C.,
  Eluent: HFIP solution with 5 mM of sodium trifluoroacetate,
  Flow rate: 1 ml/min,
  Detector: Differential refractive index detector (RI), and
  Molecular weight calibration: Five standard PMMAs different in molecular weight from one another were used.

Synthesis Example 1

Synthesis Example (1) of Glycolide

A vessel (also referred to as "reaction vessel") equipped with an agitator and a jacket was charged with a 70% by weight aqueous solution of glycolic acid. While agitating under atmospheric pressure, the solution within the vessel was heated to a temperature of 200° C. by circulating a heat transfer oil in the jacket to conduct a condensation reaction while distilling out water formed outside the system. While reducing the pressure within the vessel stepwise to 3 kPa in a state that the reaction mixture within the vessel was kept at 200° C., low-boiling substances such as the water formed and an unreacted raw material were distilled off to obtain a glycolic acid oligomer.

The glycolic acid oligomer prepared above was charged into a SUS304-made vessel equipped with an agitator and a jacket, diethylene glycol dibutyl ether as a solvent was added, and polyethylene glycol as a solubilizing agent was further added. A mixture of the glycolic acid oligomer and the solvent was subjected to a depolymerization reaction under heat and reduced pressure, and glycolide formed was distilled out together with the solvent. The distillate was condensed in a double-pipe condenser through which hot water was circulated. The condensate was received by a receiver of room temperature. The solvent in an amount corresponding to the amount of the solvent distilled out was continuously supplied to the reaction vessel for the purpose of keeping the amount of the solvent in the reaction mixture constant.

The reaction was continued to distill out a mixture of glycolide and the solvent, and the distillate was condensed. Glycolide separated out from the condensate was subjected to solid-liquid separation and recrystallized with 2-propanol and then vacuum-dried. The purity of the glycolide was 99.99% as determined by means of a differential scanning calorimeter (DSC). The process from the depolymerization to the solid-liquid separation was repeated necessary times, and recovered solids were recrystallized at a time and vacuum-dried.

Synthesis Example 2

Synthesis Example (2) of Glycolide

A condensate was obtained in the same manner as in Synthesis Example 1 except that the solubilizing agent was changed from polyethylene glycol to octyltetratriethylene glycol. The condensate was received by a receiver that hot water was circulated through a jacket. The condensate within the receiver was separated into 2 liquid layers, in which an upper layer was the solvent, and a lower layer was liquid glycolide. Even after the 2 layers were formed, the depolymerization reaction was continued, and the co-distilling out was continued. As a result, glycolide cooled by the condenser was passed through the solvent layer in the form of droplets and condensed into the lower glycolide layer. The upper solvent layer was continuously returned to the reaction vessel for the purpose of keeping the amount of the solvent in the reaction mixture constant. The pressure of the reaction system was temporally returned to atmospheric pressure to take out the liquid glycolide from a bottom of the receiver. The pressure was restored again to continue the depolymerization reaction. This process was repeated several times.

When the recovered liquid glycolide was cooled to room temperature, it was solidified. The glycolide was recrystallized with 2-propanol and then vacuum-dried. The purity of the glycolide was 99.99% as determined by means of DSC. The process from the depolymerization to the solid-liquid separation of the glycolide was repeated necessary times, and recovered solids were recrystallized at a time and vacuum-dried.

Synthesis Example 3

Synthesis Example (3) of Glycolide

Glycolide was obtained in the same manner as in Synthesis Example 1 except that the solvent was changed from diethylene glycol dibutyl ether in Synthesis Example 1 to triethylene glycol butyl octyl ether, and the solubilizing agent was changed from polyethylene glycol to polyethylene glycol monomethyl ether. The glycolide recovered from the depolymerization reaction system was purified by the recrystallization in Synthesis Example 1, whereas the glycolide was purified by means of a tower type purifier. After the depolymerization, crude glycolide crystals obtained by solid-liquid separation were continuously charged at a constant rate into a charging port for raw crystals provided at a lower part of the tower type purifier. The glycolide was agitated by an agitator installed in the interior of the tower type purifier while causing it to rise to purify the glycolide by countercurrent contact of a falling melt of a purified crystal component with the rising crude glycolide crystals within the purifier. The crystals after the purification were continuously taken out at a fixed rate from a take-off port provided at an upper part of the purifier. The purity of the purified glycolide recovered was at least 99.99% as determined by means of DSC.

Example 1

Impurities in glycolide (Lot A) prepared in accordance with Synthesis Example 1 were determined. As a result, the impurities were composed of 80 ppm of glycolic acid, 570 ppm of a glycolic acid dimer and 35 ppm of water. Accordingly, the overall proton concentration of the impurities was 0.084 mol %.

A 56-liter SUS-made closable container (melting vessel) equipped with a steam jacket structure and an agitator was charged with 22,500 g of the glycolide, 0.68 g (30 ppm) of tin dichloride dihydrate and 1.49 g of water to control the overall proton concentration to 0.13 mol %. The amount of water added was determined in view of the amount of water (moisture) contained in an atmosphere within the container. In other words, the overall proton concentration was calculated out, including the amount (0.11 g) of water contained in the atmosphere within the container.

The container was closed, steam was circulated in the jacket with agitating to heat the contents to 100° C. The contents became a uniform liquid in the course of the heating. While keeping the temperature of the contents at 100° C., they were transferred to an apparatus comprising tubes made of a metal (SUS304) and each having an inner diameter of 24 mm. This apparatus is composed of a body part, in which the tubes are provided, and upper and lower plates made of a metal (SUS304) and so constructed that all the body part and upper and lower plates are equipped with a jacket structure, and a heat transfer oil is circulated in these jacket parts. When the contents were transferred to this apparatus, the contents were charged from an upper opening of each tube, to the lower opening of which the lower plate was fitted. After completion of the transfer, the upper plate was immediately fitted to close the upper opening. The heat transfer oil heated to 170° C. was circulated in the jacket parts of the body part and upper and lower plates, and the contents were held for 7 hours. After the prescribed period of time, the heat transfer oil circulated in the jacket parts was cooled, thereby cooling the polymerization equipment to about room temperature. After the cooling, the lower plate was removed to take out bulk matter of polyglycolic acid formed from the lower opening. According to this polymerization system, the yield reaches almost 100%. The bulk matter was ground by a grinder. The physical properties of the ground product thus obtained were measured. The results are shown in Table 1.

Example 2

Impurities in glycolide (Lot B) prepared in accordance with Synthesis Example 1 were determined. As a result, the impurities were composed of 80 ppm of glycolic acid, 700 ppm of a glycolic acid dimer and 45 ppm of water. Accordingly, the overall proton concentration of the impurities was 0.099 mol %. An operation was conducted in the same manner as in Example 1 except that 22,500 g of this glycolide was used, and 0.76 g [in view of the amount (0.34 g) of water (moisture) contained in an atmosphere within the container] of water was added to control the overall proton concentration to 0.13 mol %. The results are shown in Table 1.

Example 3

Impurities in glycolide prepared in accordance with Synthesis Example 2 were determined. As a result, the impurities were composed of 70 ppm of glycolic acid, 420 ppm of a glycolic acid dimer and 35 ppm of water. Accordingly, the overall proton concentration of the impurities was 0.053 mol %. An operation was conducted in the same manner as in Example 1 except that 22,500 g of this glycolide was used, and 2.40 g [in view of the amount (0.27 g) of water (moisture) contained in an atmosphere within the container] of water was added to control the overall proton concentration to 0.13 mol %. The results are shown in Table 1.

Example 4

Impurities in glycolide prepared in accordance with Synthesis Example 3 were determined. As a result, the impurities were composed of 70 ppm of glycolic acid, 500 ppm of a glycolic acid dimer and 21 ppm of water. Accordingly, the overall proton concentration of the impurities was 0.068 mol %. An operation was conducted in the same manner as in Example 1 except that 22,500 g of this glycolide was used, and 1.82 g [in view of the amount (0.36 g) of water (moisture) contained in an atmosphere within the container] of water was added to control the overall proton concentration to 0.13 mol %. The results are shown in Table 1.

Comparative Example 1

Glycolide (Lot C) of another lot prepared in accordance with Synthesis Example 1 was charged in an amount of 22,500 g into a melting vessel as it is without determining impurities, 0.060 g of tin dichloride dihydrate was added, and no water was added. An operation on and after this was conducted in the same manner as in Example 1. The results are shown in Table 1.

Comparative Example 2

Glycolide (Lot C) of another lot prepared in accordance with Synthesis Example 1 was charged in an amount of 22,500 g into a melting vessel as it is without determining impurities, and 0.060 g of tin dichloride dihydrate and 4.54 g of water were added. The amount (4.54 g) of water added corresponds to an amount, by which the overall proton concentration is set to 0.13 mol % when the purity of the glycolide of Lot C is assumed to be 100%. An operation on and after this was conducted in the same manner as in Example 1. The results are shown in Table 1.

Comparative Example 3

Glycolide (Lot C) of another lot prepared in accordance with Synthesis Example 1 was charged in an amount of 22,500 g into a melting vessel as it is without determining impurities, and 0.060 g of tin dichloride dihydrate and 46.9 g of 1-dodecyl alcohol were added. The amount (46.9 g) of 1-dodecyl alcohol added corresponds to an amount, by which the overall proton concentration is set to 0.13 mol % when the purity of the glycolide of Lot C is assumed to be 100%. An operation on and after this was conducted in the same manner as in Example 1. The results are shown in Table 1.

melting vessel is also determined, and moreover water is used as a molecular weight control agent to control the set proton concentration, whereby a ring-opening polymer having the melt viscosity and weight average molecular weight as targeted, containing little volatile matter and also having a low yellowness index (YI) can be obtained.

Example 5

Impurities in glycolide (Lot D) of another lot prepared in accordance with Synthesis Example 1 were determined. As a result, the impurities were composed of 60 ppm of glycolic acid, 460 ppm of a glycolic acid dimer and 21 ppm of water. Accordingly, the overall proton concentration of the impurities was 0.062 mol %.

A 12-liter SUS-made closable container (melting vessel) equipped with a steam jacket structure and an agitator was charged with 2,000 g of the glycolide, 0.060 g (30 ppm) of tin dichloride dihydrate and 0.13 g [in view of the amount (0.08

TABLE 1

|  | Unit | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Glycolide |  | Syns. Ex. 1 Lot A | Syns. EX 1 Lot B | Syns. Ex. 2 | Syns. Ex. 3 | Syns. Ex. 1 Lot C | Syns. Ex. 1 Lot C | Syns. Ex. 1 Lot C |
| Molecular weight control agent |  | Water | Water | Water | Water | None | Water | 1-Dodecyl. alcohol |
| Set proton concentration | mol % | 0.13 | 0.13 | 0.13 | 0.13 | — | 0.13 | 0.13 |
| Water | ppm | 35 | 45 | 10 | 21 | Not measured | Not measured | Not measured |
| Overall proton concentration of impurities | mol % | 0.084 | 0.099 | 0.053 | 0.068 |  |  |  |
| Water (moisture) in melting vessel | g | 0.112 | 0.340 | 0.273 | 0.363 |  |  |  |
| Actual amount of water added | g | 1.49 | 0.76 | 2.40 | 1.82 | — | 4.54 | 46.90*[1] |
| Polymerization temperature | ° C. | 170 | 170 | 170 | 170 | 170 | 170 | 170 |
| Polymerization time | hr | 7 | 7 | 7 | 7 | 7 | 7 | 7 |
| Physical properties of polymer |  |  |  |  |  |  |  |  |
| Amount of volatile matter | % | 0.11 | 0.09 | 0.01 | 0.03 | 0.70 | 0.03 | 0.55 |
| Water content | ppm | 59 | 45 | 59 | 52 | 30 | 45 | 40 |
| Melt viscosity | Pa · s | 3,470 | 3,600 | 3,390 | 3,630 | 2,100 | 1,900 | 1,560 |
| Weight average molecular weight |  | 205,000 | 215,000 | 218,000 | 215,000 | 203,000 | 175,000 | 181,000 |
| Yellowness index (YI) |  | 15.0 | 14.5 | 10.4 | 15.0 | 17.5 | 12.0 | 15.2 |

*[1] amount of 1-dodecyl alcohol

The experimental results of Examples 1 to 4 indicate that even when glycolides different in impurity content and overall proton concentration of impurities from each other were used, ring-opening polymers having desired melt viscosity and weight average molecular weight and containing little remaining monomer can be obtained by controlling a set proton concentration by addition of water.

It is understood that when polymerization is conducted without measuring a impurity content in glycolides (Comparative Examples 1 to 3), the amount of volatile matter in the polymer (ring-opening polymer) formed becomes great, or the melt viscosity and weight average molecular weight become low. Accordingly, even when the set proton concentration is controlled, the desired melt viscosity and weight average molecular weight cannot be achieved, and the amount of the remaining monomer is also varied. In the case (Comparative Example 1) where no water is added in particular, the amount of volatile matter in the polymer formed becomes great. In the case (Comparative Example 3) where the higher alcohol is added, the melt viscosity of the polymer formed becomes low, and the amount of the volatile matter is also increased.

Accordingly, it is understood that impurities in glycolide are determined, and an amount of water (moisture) within the g) of water (moisture) contained in an atmosphere within the container] of water to control the overall proton concentration to 0.13 mol %.

The container was closed, steam was circulated in the jacket with agitating to heat the contents to 100° C. The contents became a uniform liquid in the course of the heating. While keeping the temperature of the contents at 100° C., they were transferred to an apparatus comprising tubes made of a metal (SUS304) and each having an inner diameter of 24 mm. This apparatus is composed of a body part, in which the tubes are provided, and upper and lower plates made of a metal (SUS304) and so constructed that all the body part and upper and lower plates are equipped with a jacket structure, and a heat transfer oil is circulated in these jacket parts. When the contents were transferred to this apparatus, the lower plate was fitted. After completion of the transfer into each tube, the upper plate was immediately fitted. The heat transfer oil heated to 170° C. was circulated in the jacket parts of the body part and upper and lower plates, and the contents were held for 7 hours. After the prescribed period of time, the heat transfer oil circulated in the jacket parts was cooled, thereby cooling the polymerization equipment to about room temperature. After the cooling, the lower plate was removed to take out bulk matter of polyglycolic acid formed. According to this polymerization system, the yield reaches almost 100%. The bulk matter was ground by a grinder. The physical properties of the ground product thus obtained were measured. The results are shown in Table 2.

When regression analysis was performed on the basis of a database stored by the experiment on the premise of such polymerization conditions (purification degree of the monomer, the kind of the polymerization equipment, the kind and amount of the catalyst, polymerization temperature, polymerization time, etc.) as described above when the ring-opening polymerization of the glycolide was conducted by using water as the molecular weight control agent, it has been found that the following non-linear relational expression is obtained between them.

Namely, when the overall proton concentration (x) is used as an independent variable (explanatory variable), and the melt viscosity (y) of the ring-opening polymer is used as a dependent variable (explained variable), the following non-linear relational expression (1) of a semilogarithm model can be obtained between them.

$$y = a \cdot b^x \quad (1)$$

Under the above polymerization conditions, a is 10,000, and b is 0.0004325. This expression (1) may be rewritten into the following expression (2):

$$\log y = \log a + x \log b \quad (2)$$

More specifically, the following expression (3) may be derived from the database.

$$\log y = 4.00x - 3.364x \quad (3)$$

It has been proved that the above-described relational expression of the semilogarithm model is high in multiple correlation and multiple determination $R^2$ ($R^2 = 0.9986$) and most approximate to the experimental data. The reason why the overall proton concentration was set to 0.13 mol % by adding water in Example 1 is that it is intended to obtain a ring-opening polymer having a melt viscosity of about 3,600 Pa·s. As a result, a ring-opening polymer having a melt viscosity of 3,490 Pa·s was able to be obtained as shown in Table 2.

Example 6

An operation was conducted in the same manner as in Example 5 except that 0.28 g [in view of the amount (0.08 g) of water (moisture) contained in an atmosphere within the container] of water was added to control the overall proton concentration to 0.18 mol %. The reason why the overall proton concentration was set to 0.18 mol % by adding water is that it is intended to obtain a ring-opening polymer having a melt viscosity of about 2,500 Pa·s. As a result, a ring-opening polymer having a melt viscosity of 2,550 Pa·s was able to be obtained. The results are shown in Table 2.

Example 7

An operation was conducted in the same manner as in Example 5 except that 0.43 g [in view of the amount (0.05 g) of water (moisture) contained in an atmosphere within the container] of water was added to control the overall proton concentration to 0.22 mol %. The reason why the overall proton concentration was set to 0.22 mol % by adding water is that it is intended to obtain a ring-opening polymer having a melt viscosity of about 1,800 Pa·s. As a result, a ring-opening polymer having a melt viscosity of 1,920 Pa·s was able to be obtained. The results are shown in Table 2.

Example 8

An operation was conducted in the same manner as in Example 5 except that 1.16 g [in view of the amount (0.11 g) of water (moisture) contained in an atmosphere within the container] of water was added to control the overall proton concentration to 0.47 mol %. The reason why the overall proton concentration was set to 0.47 mol % by adding water is that it is intended to obtain a ring-opening polymer having a melt viscosity of about 260 Pa·s. As a result, a ring-opening polymer having a melt viscosity of 260 Pa·s was able to be obtained. The results are shown in Table 2.

Comparative Example 4

An operation was conducted in the same manner as in Example 5 except that no water was added. When the amount (0.08 g) of water (moisture) contained in an atmosphere within the melting vessel was taken into consideration, the overall proton concentration was 0.09 mol %. The results are shown in Table 2.

TABLE 2

|  | Unit | Ex. 5 | Ex. 6 | Ex. 7 | Ex. 8 | Comp. Ex. 4 |
|---|---|---|---|---|---|---|
| Molecular weight control agent |  | Water | Water | Water | Water | None |
| Set proton concentration | mol % | 0.13 | 0.18 | 0.22 | 0.47 | 0.09 |
| Water | ppm | 21 | 21 | 21 | 21 | 21 |
| Overall proton concentration of impurities | mol % | 0.062 | 0.062 | 0.062 | 0.062 | 0.062 |
| Water (moisture) in melting vessel | g | 0076 | 0.080 | 0.054 | 0.109 | 0.076 |
| Actual amount of water added | g | 0.13 | 0.28 | 0.43 | 1.16 | — |
| Polymerization temperature | °C. | 170 | 170 | 170 | 170 | 170 |
| Polymerization time | hr | 7 | 7 | 7 | 7 | 7 |
| Physical properties of polymer |  |  |  |  |  |  |
| Amount of volatile matter | % | 0.10 | 0.10 | 0.07 | 0.05 | 0.80 |

TABLE 2-continued

|  | Unit | Ex. 5 | Ex. 6 | Ex. 7 | Ex. 8 | Comp. Ex. 4 |
|---|---|---|---|---|---|---|
| Water content | ppm | 78 | 55 | 33 | 37 | 40 |
| Melt viscosity | Pa·s | 3,490 | 2,550 | 1,920 | 260 | 1,500 |
| Weight average molecular weight |  | 214,000 | 198,000 | 177,000 | 104,000 | 198,000 |
| Yellowness index (YI) |  | 13.7 | 11.1 | 6.0 | 5.7 | 15.0 |

As apparent from the results shown in Table 2, according to the process of the present invention (Examples 5 to 8), ring-opening polymers (polyglycolic acids) of glycolide each having the intended melt viscosity can be obtained by adding a small amount of water.

Examples 7 and 8 particularly markedly indicate a tendency to remarkably improve the yellowness index (YI) in a region that the melt viscosity and weight average molecular weight are relatively low when water is used as the molecular weight control agent. A ring-opening polymer low in both melt viscosity and yellowness index (YI) is suitable for use as a polymer for injection molding.

When no water is added (Comparative Example 4), the amount of volatile matter in the resulting ring-opening polymer becomes great. On the contrary, when water is used as the molecular weight control agent (Examples 5 to 8), the amount of the volatile matter can be markedly decreased.

Example 9

An operation was conducted in the same manner as in Example 7 except that 0.42 g [in view of the amount (0.07 g) of water (moisture) contained in an atmosphere within the container] of water was added to control the overall proton concentration to 0.22 mol %, and a heat transfer oil heated to 200° C. was circulated in the jacket parts of the body part and upper and lower plates in the polymerization equipment to hold the contents for 5 hours. The results are shown in Table 3.

Comparative Example 5

An operation was conducted in the same manner as in Example 9 except that no water was added. When the amount (0.09 g) of water (moisture) contained in an atmosphere within the melting vessel was taken into consideration, the overall proton concentration was 0.09 mol %. The results are shown in Table 3.

TABLE 3

|  | Unit | Ex. 9 | Comp. Ex. 5 |
|---|---|---|---|
| Molecular weight control agent |  | Water | None |
| Set proton concentration | mol % | 0.22 | 0.09 |
| Water | ppm | 21 | 21 |
| Overall proton concentration of impurities | mol % | 0.062 | 0.062 |
| Water (moisture) in melting vessel | g | 0.070 | 0.060 |
| Actual amount of water added | g | 0.42 | — |
| Polymerization temperature | ° C. | 200 | 200 |
| Polymerization time | hr | 5 | 5 |
| Physical properties of polymer |  |  |  |
| Amount of volatile matter | % | 0.10 | 0.72 |
| Water content | ppm | 42 | 35 |
| Melt viscosity | Pa·s | 1,300 | 1,950 |

TABLE 3-continued

|  | Unit | Ex. 9 | Comp. Ex. 5 |
|---|---|---|---|
| Weight average molecular weight |  | 160,000 | 170,000 |
| Yellowness index (YI) |  | 10.0 | 17.9 |

Example 9 corresponds to the case where in Example 7, the polymerization temperature was changed from 170° C. to 200° C., and the polymerization time was changed from 7 hours to 5 hours. A ring-opening polymer little in volatile matter and low in yellowness index (YI) is obtained. On the other hand, Comparative Example 5 corresponds to the case where in Comparative Example 4, the polymerization temperature was changed from 170° C. to 200° C., and the polymerization time was changed from 7 hours to 5 hours. A ring-opening polymer great in volatile matter and also high in yellowness index (YI) is obtained.

Example 10

Impurities in glycolide (Lot E) of another lot prepared in accordance with Synthesis Example 1 were determined. As a result, the impurities were composed of 50 ppm of glycolic acid, 360 ppm of a glycolic acid dimer and 33 ppm of water. Accordingly, the overall proton concentration of the impurities was 0.060 mol %. An operation was conducted in the same manner as in Example 1 except that 22,500 g of this glycolide, 0.68 g (30 ppm) of tin dichloride dihydrate and 2.11 g [in view of the amount (0.34 g) of water (moisture) contained in an atmosphere within the container] of water were added to control the overall proton concentration to 0.13 mol %. The results are shown in Table 4.

Example 11

After an aluminum-made pan was charged with the same glycolide as that used in Example 10 and purged with dry nitrogen, the pan was covered and left to stand at room temperature. After 4 weeks, the pan was opened in a dry box, and a part of the glycolide was taken out to analyze it. As a result, the glycolide contained 100 ppm of glycolic acid, 1,000 ppm of a glycolic acid dimer and 21 ppm of water, and the overall proton concentration of the impurities was changed to 0.115 mol %. An operation was conducted in the same manner as in Example 10 except that this glycolide was used, and 0.17 g [in view of the amount (0.35 g) of water (moisture) contained in an atmosphere within the container] of water was added to control the overall proton concentration (set proton concentration) to 0.13 mol %. The results are shown in Table 4.

Example 12

With respect to glycolide stored for 4 weeks in the same manner as in Example 11, 2.11 g [in view of the amount (0.35 g) of water (moisture) contained in an atmosphere within the container] of water was added in exactly the same manner as in Example 10 assuming that the amount of impurities is the same as that before the storage (namely, overall proton concentration of the impurities: 0.060 mol %) without conducting the analysis of the impurities. The actual overall proton concentration (set proton concentration) was 0.1855 mol %. The results are shown in Table 4.

TABLE 4

|  | Unit | Ex. 10 | Ex. 11 | Ex. 12 |
|---|---|---|---|---|
| Molecular weight control agent |  | Water | Water | Water |
| Set proton concentration | mol % | 0.13 | 0.13 | 0.1855 |
| Water | ppm | 33 | 21 | 21 |
| Overall proton concentration of impurities | mol % | 0.060 | 0.115 | 0.115 |
| Water (moisture) in melting vessel | g | 0.335 | 0.346 | 0.346 |
| Actual amount of water added | g | 2.11 | 0.17 | 2.11 |
| Polymerization temperature | ° C. | 170 | 170 | 170 |
| Polymerization time | hr | 7 | 7 | 7 |
| Physical properties of polymer |  |  |  |  |
| Amount of volatile matter | % | 0.15 | 0.12 | 0.03 |
| Water content | ppm | 35 | 26 | 18 |
| Melt viscosity | Pa·s | 3,780 | 3,810 | 2,320 |
| Weight average molecular weight |  | 220,000 | 215,000 | 175,000 |
| Yellowness index (YI) |  | 16.2 | 17.2 | 11.1 |

When Example 10 is compared with Example 11, it is understood that even when the amount of impurities contained in the glycolide is increased during its storage, and the overall proton concentration of the impurities is changed, a ring-opening polymer having melt viscosity, weight average molecular weight and yellowness index (YI) of almost the same level as those before the storage is obtained by adding water as the molecular weight control agent.

In the case of Example 12, since the amount of water to be added is determined assuming that the overall proton concentration of the impurities is kept constant without conducting the analysis of impurities by change of glycolide with time, a ring-opening polymer considerably changed in melt viscosity, weight average molecular weight and yellowness index (YI) compared with Example 10 is obtained. It goes without saying that a ring-opening polymer having desired values as to the melt viscosity and the like may be obtained even in Example 12 by conducting the analysis of the impurities and adding water to control the set proton concentration to a desired value.

Example 13

An operation was conducted in the same manner as in Example 10 except that 22,050 g (glycolic acid: 50 ppm, glycolic acid dimer: 380 ppm, water: 20 ppm; overall proton concentration of impurities: 0.053 mol %) of glycolide prepared by the same process as in Synthesis Example 1 and 450 g (lactic acid: 0 ppm, lactic acid dimer: 270 ppm, water: 8 ppm; overall proton concentration of impurities: 0.030 mol %) of L-lactide were used as monomers, 1.45 g [in view of the amount (0.27 g) of water (moisture) contained in an atmosphere within the container] of water were added to control the overall proton concentration (set proton concentration) to 0.105 mol %, a heat transfer oil heated to 170° C. was circulated in the jacket part of the polymerization equipment, and the temperature of the upper and lower plates was also kept to 170° C. to hold the contents for 24 hours. After completion of the polymerization, the yield of bulk matter of a poly(glycolic acid/L-lactic acid) copolymer formed was almost 100%. The bulk matter was ground by a grinder, and the physical properties of the ground product were measured. The results are shown in Table 5.

Example 14

An operation was conducted in the same manner as in Example 13 except that 22,050 g (glycolic acid: 70 ppm, glycolic acid dimer: 360 ppm, water: 20 ppm; overall proton concentration of impurities: 0.054 mol %) of glycolide and 450 g (lactic acid: 0 ppm, lactic acid dimer: 270 ppm, water: 8 ppm; overall proton concentration of impurities: 0.030 mol %) of L-lactide were used, and 2.06 g [in view of the amount (0.36 g) of water (moisture) contained in an atmosphere within the container] of water were added to control the overall proton concentration (set proton concentration) to 0.124 mol %. After completion of the polymerization, the yield of bulk matter of a poly(glycolic acid/L-lactic acid) copolymer formed was almost 100%. The bulk matter was ground by a grinder, and the physical properties of the ground product were measured. The results are shown in Table 5.

Comparative Example 6

An operation was conducted in the same manner as in Example 13 except that no water was added. When the amount (0.36 g) of water (moisture) contained in an atmosphere within the melting vessel was taken into consideration, the overall proton concentration was 0.064 mol %. After completion of the polymerization, the yield of bulk matter of polyglycolic acid formed was almost 100%. The results are shown in Table 5.

TABLE 5

|  | Unit | Ex. 13 | Ex. 14 | Comp. Ex. 6 |
|---|---|---|---|---|
| Charged composition(GL/L-LA) | wt/wt | 98/2 | 98/2 | 98/2 |
| Molecular weight control agent |  | Water | Water | None |
| Set proton concentration | mol % | 0.105 | 0.124 | 0.064 |
| Glycolic acid | ppm | 50 | 70 | 50 |
| Glycolic acid dimer | ppm | 380 | 360 | 380 |

TABLE 5-continued

|  | Unit | Ex. 13 | Ex. 14 | Comp. Ex. 6 |
|---|---|---|---|---|
| Water in glycolide | ppm | 20 | 20 | 20 |
| Overall proton concentration of impurities in glycolide | mol % | 0.053 | 0.054 | 0.053 |
| L-Lactic acid | ppm | 0 | 0 | 0 |
| L-Lactic acid dimer | ppm | 270 | 270 | 270 |
| Water in L-lactide | ppm | 8 | 8 | 8 |
| Overall proton concentration of impurities in L-lactide | mol % | 0.030 | 0.030 | 0.030 |
| Overall proton concentration of impurities in the whole monomer | mol % | 0.053 | 0.054 | 0.053 |
| Water (moisture) in melting vessel | g | 0.270 | 0.360 | 0.360 |
| Actual amount of water added | g | 1.45 | 2.06 | — |
| Polymerization temperature | ° C. | 170 | 170 | 170 |
| Polymerization time | hr | 24 | 24 | 24 |
| Physical properties of polymer |  |  |  |  |
| Amount of volatile matter | % | 0.16 | 0.20 | 0.91 |
| Water content | ppm | 70 | 70 | 65 |
| Melt viscosity | Pa · s | 3,100 | 2,380 | 1,200 |
| Weight average molecular weight |  | 212,000 | 193,000 | 203,000 |
| Yellowness index (YI) |  | 19.0 | 17.8 | 23.2 |

From the results of Examples 13 and 14, it is understood that water is effective as the molecular weight control agent even in the case of the ring-opening copolymers of glycolide and lactide, and ring-opening copolymers scarcely containing volatile matter and having desired melt viscosity and weight average molecular weight are obtained. In the case (Comparative Example 6) where no water was used as the molecular weight control agent, a ring-opening copolymer containing a great amount of volatile matter and having a melt viscosity lower than the desired value is obtained. The yellowness index (YI) also becomes high.

Example 15

An operation was conducted in the same manner as in Example 12 except that 21,375 g (glycolic acid: 60 ppm, glycolic acid dimer: 460 ppm, water: 21 ppm; overall proton concentration of impurities: 0.063 mol %) of glycolide and 1,125 g (lactic acid: 0 ppm, lactic acid dimer: 270 ppm, water: 8 ppm; overall proton concentration of impurities: 0.030 mol %) of L-lactide were used, and 0.90 g [in view of the amount (0.27 g) of water (moisture) contained in an atmosphere within the container] of water were added to control the overall proton concentration (set proton concentration) to 0.095 mol %. After completion of the polymerization, the yield of bulk matter of a poly(glycolic acid/L-lactic acid) copolymer formed was almost 100%. The physical properties of a ground product of this bulk matter were measured. The results are shown in Table 6.

Example 16

An operation was conducted in the same manner as in Example 14 except that 21,375 g (glycolic acid: 60 ppm, glycolic acid dimer: 570 ppm, water: 30 ppm; overall proton concentration of impurities: 0.078 mol %) of glycolide and 1,125 g (lactic acid: 0 ppm, lactic acid dimer: 270 ppm, water: 8 ppm; overall proton concentration of impurities: 0.030 mol %) of L-lactide were used, and 1.12 g [in view of the amount (0.31 g) of water (moisture) contained in an atmosphere within the container] of water were added to control the overall proton concentration (set proton concentration) to 0.117 mol %. After completion of the polymerization, the yield of bulk matter of a poly(glycolic acid/L-lactic acid) copolymer formed was almost 100%. The results are shown in Table 6.

Comparative Example 7

An operation was conducted in the same manner as in Example 15 except that no water was added. When the amount (0.27 g) of water (moisture) contained in an atmosphere within the melting vessel was taken into consideration, the overall proton concentration was 0.069 mol %. After completion of the polymerization, the yield of bulk matter of polyglycolic acid formed was almost 100%. The results are shown in Table 6.

TABLE 6

|  | Unit | Ex. 15 | Ex. 16 | Comp. Ex. 7 |
|---|---|---|---|---|
| Charged composition (GL/L-LA) | wt/wt | 95/5 | 95/5 | 95/5 |
| Molecular weight control agent |  | Water | Water | None |
| Set proton concentration | mol % | 0.095 | 0.117 | 0.069 |

TABLE 6-continued

|  | Unit | Ex. 15 | Ex. 16 | Comp. Ex. 7 |
|---|---|---|---|---|
| Glycolic acid | ppm | 60 | 60 | 60 |
| Glycolic acid dimer | ppm | 460 | 570 | 460 |
| Water in glycolide | ppm | 21 | 30 | 21 |
| Overall proton concentration of impurities in glycolide | mol % | 0.063 | 0.078 | 0.063 |
| L-Lactic acid | ppm | 0 | 0 | 0 |
| L-Lactic acid dimer | ppm | 270 | 270 | 270 |
| Water in L-lactide | ppm | 8 | 8 | 8 |
| Overall proton concentration of impurities in L-lactide | Mol % | 0.030 | 0.030 | 0.030 |
| Overall proton concentration of impurities in the whole monomer | mol % | 0.061 | 0.076 | 0.061 |
| Water (moisture) in melting vessel | g | 0.270 | 0.310 | 0.270 |
| Actual amount of water added | g | 0.90 | 1.12 | — |
| Polymerization temperature | ° C. | 170 | 170 | 170 |
| Polymerization time | hr | 24 | 24 | 24 |
| Physical properties of polymer |  |  |  |  |
| Amount of volatile matter | % | 0.19 | 0.25 | 1.01 |
| Water content | ppm | 90 | 90 | 75 |
| Melt viscosity | Pa·s | 2,200 | 1,140 | 1,040 |
| Weight average molecular weight |  | 170,000 | 144,000 | 168,000 |
| Yellowness index (YI) |  | 20.9 | 19.0 | 25.0 |

From the results of Examples 15 and 16, it is understood that water is effective as the molecular weight control agent even in the case of the ring-opening copolymers of glycolide and lactide, and ring-opening copolymers scarcely containing volatile matter and having desired melt viscosity and weight average molecular weight are obtained. In the case (Comparative Example 7) where no water was used as the molecular weight control agent, a ring-opening copolymer containing a great amount of volatile matter and having a melt viscosity lower than the desired value is obtained. The yellowness index (YI) also becomes high.

INDUSTRIAL APPLICABILITY

According to the present invention, there is provided a process for producing an aliphatic polyester such as polyglycolic acid by subjecting a cyclic ester such as glycolide to ring-opening polymerization, by which physical properties such as a melt viscosity and a molecular weight can be precisely controlled by using water as a molecular weight control agent. According to the present invention, a cyclic ester highly purified is used as a monomer, water is added to the cyclic ester to control the overall proton concentration in the cyclic ester, whereby at least one physical property among melt viscosity, molecular weight and yellowness index of the resulting aliphatic polyester can be controlled.

The invention claimed is:

1. A process for producing an aliphatic polyester by subjecting a cyclic ester to bulk ring-opening polymerization, which comprises
   i) providing a cyclic ester purified to the extent that a water content is at most 50 ppm, an α-hydroxycarboxylic acid content is at most 100 ppm, and linear α-hydroxycarboxylic acid oligomers content is at most 1,000 ppm,
   ii) controlling an overall proton concentration in a ring-opening polymerization system by adding a molecular weight control agent consisting of water to the cyclic ester to control the overall proton concentration in the cyclic ester to be within a range of higher than 0.09 mol % but lower than 2.0 mol %, wherein the overall proton concentration in the cyclic ester is calculated out on the basis of the total amount of hydroxycarboxylic compounds consisting of the α-hydroxycarboxylic acid and the linear α-hydroxycarboxylic acid oligomers as impurities in the cyclic ester, water contained as impurities in the cyclic ester, and water added to the cyclic ester, and
   iii) subjecting the cyclic ester to ring opening polymerization in the closed state and in the presence of a ring-opening polymerization catalyst,
   thereby controlling melt viscosity of the resulting aliphatic polyester, wherein the resulting aliphatic polyester has a melt viscosity of 50 to 6000 Pa·s as measured at a temperature of 240° C. and a shear rate of 121 sec$^{-1}$.

2. The production process according to claim 1, wherein the overall proton concentration of the impurities contained in the purified cyclic ester before the addition of water is within a range of 0.01 to 0.5 mol %.

3. The production process according to claim 1, wherein when water is added to the purified cyclic ester to control the overall proton concentration in the cyclic ester, the amount of water added to the cyclic ester is controlled on the basis of a relational expression between a predetermined overall proton concentration in the cyclic ester and a melt viscosity value to be controlled so as to give an overall proton concentration corresponding to a targeted value of the melt viscosity to be controlled.

4. The production process according to claim 3, wherein the relational expression is a relational expression of a linear model, double logarithm model or semilogarithm model, which is obtained by conducting ring-opening polymerization with the overall proton concentration in the cyclic ester varied, using, as a database, measured results of the melt viscosity of aliphatic polyesters obtained by the ring-opening polymerization of the cyclic esters of the respective overall proton concentrations, and subjecting the database to regression analysis.

5. The production process according to claim 4, wherein the relational expression is a relational expression of a semi-logarithm model represented by the following expression (1), in which the overall proton concentration x in the cyclic ester is used as an independent variable, and the melt viscosity y is used as a dependent variable, $$y=a \cdot b^x \quad (1)$$

wherein, a and b are parameters.

6. The production process according to claim 1, wherein water is added to the purified cyclic ester to control the overall proton concentration in the cyclic ester, the cyclic ester is heated and melted in the presence of the ring-opening polymerization catalyst, and the cyclic ester in the molten state is then subjected to ring-opening polymerization to deposit a polymer formed.

7. The production process according to claim 1, wherein water is added to the purified cyclic ester to control the overall proton concentration in the cyclic ester, the cyclic ester is heated and melted in the presence of the ring-opening polymerization catalyst in a melting vessel, the cyclic ester in the molten state is transfeffed to a polymerization equipment with a plurality of tubes capable of being closed and opened at their both ends, and the cyclic ester is then subjected to ring-opening polymerization in the closed state in the respective tubes to deposit a polymer formed.

8. The production process according to claim 1, wherein water is added to the purified cyclic ester to control the overall proton concentration in the cyclic ester, the cyclic ester is heated and melted in the presence of the ring-opening polymerization catalyst in a melting vessel, the ring-opening polymerization of the cyclic ester in the molten state is allowed to progress in a reaction vessel equipped with a stirrer, a polymer formed is taken out, the polymer is cooled and solidified once, and solid phase polymerization is then continued at a temperature lower than the melting point of the polymer.

9. The production process according to claim 1, wherein the cyclic ester is a cyclic diester of an α-hydroxycarboxylic acid, or a lactone.

10. The production process according to claim 9, wherein the cyclic diester of the α-hydroxycarboxylic acid is glycolide or lactide.

11. The production process according to claim 1, wherein the cyclic ester is glycolide alone or a mixture of at least 60% by weight of glycolide and at most 40% by weight of another cyclic monomer ring-opening-copolymerizable with glycolide.

12. The production process according to claim 11, wherein the another cyclic monomer is lactide.

13. The production process according to claim 11, which obtains polyglycolic acid having a weight average molecular weight of at least 50,000.

14. The production process according to claim 11, which obtains polyglycolic acid having a yellowness index of 4 to 20.

15. The production process according to claim 11, which obtains polyglycolic acid having a weight average molecular weight of at most 200,000 and a yellowness index of at most 10.

16. The production process according to claim 1, which comprises adding water to the cyclic ester to control the overall proton concentration in the cyclic ester, thereby further controlling molecular weight of the resulting aliphatic polyester.

17. The production process according to claim 1, which comprises adding water to the cyclic ester to control the overall proton concentration in the cyclic ester, thereby further controlling yellowness index of the resulting aliphatic polyester.

18. The production process of claim 1, wherein the ring-opening polymerization catalyst comprises an oxide, chloride, carboxylate or alkoxide of tin, titanium, aluminum, antimony, zirconium or zinc.

19. A process for producing a polyglycolic acid polyester by subjecting a glycolide cyclic ester to bulk ring-opening polymerization, which comprises
   i) providing a glycolide cyclic ester purified to the extent that a water content is at most 50 ppm, an α-hydroxycarboxylic acid content is at most 100 ppm, and linear α-hydroxycarboxylic acid oligomers content is at most 1,000 ppm,
   ii) controlling an overall proton concentration in a ring-opening polymerization system by adding a molecular weight control agent consisting of water to the glycolide cyclic ester to control the overall proton concentration in the glycolide cyclic ester to be within a range of higher than 0.09 mol % but lower than 2.0 mol %, wherein the overall proton concentration in the glycolide cyclic ester is calculated out on the basis of the total amount of hydroxycarboxylic compounds consisting of the α-hydroxycarboxylic acid and the linear α-hydroxycarboxylic acid oligomers as impurities in the glycolide cyclic ester, water contained as impurities in the glycolide cyclic ester, and water added to the glycolide cyclic ester, and
   iii) subjecting the glycolide cyclic ester to ring opening polymerization in the closed state and in the presence of a ring-opening polymerization catalyst,
   thereby controlling melt viscosity of the resulting polyglycolic acid polyester, wherein the resulting polyglycolic acid polyester has a melt viscosity of 50 to 6000 Pa·s as measured at a temperature of 240° C. and a shear rate of 121 sec$^1$.

20. The production process of claim 19, wherein the ring-opening polymerization catalyst comprises an oxide, chloride, carboxylate or alkoxide of tin, titanium, aluminum, antimony, zirconium or zinc.

* * * * *

UNITED STATES PATENT AND TRADEMARK OFFICE
CERTIFICATE OF CORRECTION

PATENT NO. : 7,622,546 B2
APPLICATION NO. : 10/530554
DATED : November 24, 2009
INVENTOR(S) : Hiroyuki Sato et al.

It is certified that error appears in the above-identified patent and that said Letters Patent is hereby corrected as shown below:

Column 29, Line 22, change "transfeffed" to --transferred--

Column 30, Line 48, change "$sec^1$" to --$sec^{-1}$--

Signed and Sealed this

Twenty-fifth Day of May, 2010

David J. Kappos
*Director of the United States Patent and Trademark Office*